(12) United States Patent
Nigo et al.

(10) Patent No.: US 10,432,041 B2
(45) Date of Patent: Oct. 1, 2019

(54) STATOR, MOTOR, COMPRESSOR, AND REFRIGERATING AND AIR-CONDITIONING APPARATUS

(71) Applicant: Mitsubishi Electric Corporation, Tokyo (JP)

(72) Inventors: Masahiro Nigo, Tokyo (JP); Shuichi Kitano, Tokyo (JP); Yasusi Shoji, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 74 days.

(21) Appl. No.: 15/756,225

(22) PCT Filed: Nov. 4, 2015

(86) PCT No.: PCT/JP2015/081004
§ 371 (c)(1),
(2) Date: Feb. 28, 2018

(87) PCT Pub. No.: WO2017/077590
PCT Pub. Date: May 11, 2017

(65) Prior Publication Data
US 2018/0248419 A1    Aug. 30, 2018

(51) Int. Cl.
*H02K 21/12* (2006.01)
*H02K 1/14* (2006.01)
(Continued)

(52) U.S. Cl.
CPC ......... *H02K 1/148* (2013.01); *F04C 18/0215* (2013.01); *F04C 23/008* (2013.01);
(Continued)

(58) Field of Classification Search
CPC .......... H02K 1/148; H02K 1/02; H02K 1/276; H02K 1/2766; H02K 3/12; H02K 3/18; H02K 3/34; H02K 3/345
USPC ............................................ 310/156.53, 194
See application file for complete search history.

(56) References Cited

U.S. PATENT DOCUMENTS

| 2001/0030483 A1* | 10/2001 | Masumoto | ............. | H02K 1/165 |
| | | | | 310/216.008 |
| 2009/0284096 A1* | 11/2009 | Katagiri | ................. | H02K 1/148 |
| | | | | 310/216.001 |

(Continued)

FOREIGN PATENT DOCUMENTS

| CN | 101652914 A | 2/2010 |
| JP | 11-150900 A | 6/1999 |

(Continued)

OTHER PUBLICATIONS

International Search Report of the International Searching Authority dated Jan. 26, 2016 for the corresponding International application No. PCT/JP2015/081004 (and English translation).

(Continued)

*Primary Examiner* — Thanh Lam
(74) *Attorney, Agent, or Firm* — Posz Law Group, PLC

(57) ABSTRACT

A stator includes a winding and a plurality of split core parts arranged annularly in a circumferential direction around an axis line. Each of the plurality of split core parts includes a yoke part, a tooth part, a connection part including a curved surface, and a first insulator provided on an end part of the tooth part. The first insulator includes a first protruding part protruding beyond the curved surface.

14 Claims, 17 Drawing Sheets

CIRCUMFERENTIAL DIRECTION

(51) Int. Cl.
*H02K 3/34* (2006.01)
*F04C 18/02* (2006.01)
*F25B 31/02* (2006.01)
*H02K 1/02* (2006.01)
*H02K 1/27* (2006.01)
*H02K 3/18* (2006.01)
*H02K 3/32* (2006.01)
*F04C 23/00* (2006.01)
*F04C 29/00* (2006.01)
*F04C 18/356* (2006.01)

(52) U.S. Cl.
CPC ........ *F04C 29/0085* (2013.01); *F25B 31/023* (2013.01); *F25B 31/026* (2013.01); *H02K 1/02* (2013.01); *H02K 1/276* (2013.01); *H02K 1/2766* (2013.01); *H02K 3/18* (2013.01); *H02K 3/325* (2013.01); *H02K 3/34* (2013.01); *F04C 18/356* (2013.01); *F04C 2210/263* (2013.01); *F25B 2400/121* (2013.01); *H02K 2203/12* (2013.01); *H02K 2213/03* (2013.01)

(56) References Cited

U.S. PATENT DOCUMENTS

| | | | |
|---|---|---|---|
| 2010/0135830 A1* | 6/2010 | Yasuda | H02K 1/185 417/410.1 |
| 2015/0139830 A1* | 5/2015 | Nigo | H02K 21/16 417/410.1 |
| 2016/0111933 A1* | 4/2016 | Takimoto | H02K 1/148 310/43 |
| 2017/0162311 A1 | 6/2017 | Shimbo et al. | |
| 2018/0115227 A1* | 4/2018 | Kim | H02K 1/146 |

FOREIGN PATENT DOCUMENTS

| | | |
|---|---|---|
| JP | 2001-095188 A | 4/2001 |
| JP | 2003-244903 A | 8/2003 |
| JP | 2007-215330 A | 8/2007 |
| JP | 2008-092636 A | 4/2008 |
| JP | 2008-306858 A | 12/2008 |
| JP | 2012-095492 A | 5/2012 |
| JP | 2014-050290 A | 3/2014 |
| WO | 2015/147304 A1 | 10/2015 |

OTHER PUBLICATIONS

Office Action dated Oct. 2, 2018 issued in corresponding JP patent application No. 2017-548553 (and English tanslation).

Office Action dated Jun. 12, 2019 issued in corresponding CN patent application No. 201580083936.8 (and English tanslation).

* cited by examiner

CIRCUMFERENTIAL DIRECTION

STATOR, MOTOR, COMPRESSOR, AND REFRIGERATING AND AIR-CONDITIONING APPARATUS

CROSS REFERENCE TO RELATED APPLICATION

This application is a U.S. national stage application of International Patent Application No. PCT/JP2015/081004 filed on Nov. 4, 2015, the disclosure of which is incorporated herein by reference.

TECHNICAL FIELD

The present invention relates to a stator, a motor, a compressor, and a refrigerating and air-conditioning apparatus.

BACKGROUND ART

In general, in a stator for a motor, a winding is wound around a stator core of the stator with an insulator in between, and thus a coil is formed in the stator. It is desirable that the density of the winding (the space factor of the coil) wound around the stator core be large, in order to enhance the performance of the motor. Hence, a stator using a substantially T-shaped stator core has been used; the substantially T-shaped core has corners forming right angles between inner circumferential surfaces of a yoke part and side surfaces of a tooth part. The stator core having the corners forming right angles can increase the density of the winding in the stator. However, in a conventional annular stator core (a stator core that is not composed of split cores), since a winding is inserted between two tooth parts adjacent to each other and winding is performed, it has been difficult to align the winding on the tooth part, regardless of the shapes of the corners. Hence, a split stator composed of a plurality of split cores each including a tooth part is used (e.g., refer to patent reference 1) as a stator for a motor. In this split stator, windings can be wound around the tooth parts in a state in which the split cores are arranged linearly. When the split cores are arranged linearly, since there is a wide space between the adjacent tooth parts, the winding is easily aligned on the tooth part, by winding the winding around the tooth part with a flyer method, for example. Thus, the split stator composed of the split cores including the corners forming right angles makes it easy to align the windings on the tooth parts, and can increase the density of the windings in the split stator.

PATENT LITERATURE

PATENT REFERENCE 1: Japanese Patent Application Publication No. 2008-92636

However, in a motor provided with the stator using the stator core having the corners forming right angles between the inner circumferential surfaces of the yoke part and the side surfaces of the tooth parts, since magnetic paths are long at the corners of the stator core and the magnetic flux density is large, an iron loss is easily caused in the stator. As a result, the motor efficiency (a rate of machine output to input electric power) is lowered in some cases. Hence, it is possible to reduce the iron loss and to prevent the motor efficiency from being lowered, by forming a stator core so as to have the curved surfaces at its corners, for example. However, in a case of the stator core formed to have the curved surfaces at its corners, winding disorder of a winding wound around the curved surface parts is sometimes caused and it is difficult to increase the density of the winding in the stator.

SUMMARY

Thus, a purpose of the present invention is to prevent the winding disorder of the winding wound around the stator including the split core part having the curved surface at the corner between the inner circumferential surface of the yoke part and the side surface of the tooth part.

A stator of the present invention includes a winding and a plurality of split core parts arranged annularly in a circumferential direction around an axis line. Each of the plurality of split core parts includes a yoke part, a tooth part extending in a radial direction toward the axis line from the yoke part, a connection part including a curved surface connecting the yoke part and the tooth part, a first insulator having an outer edge and provided on an end part of the tooth part in an axis line direction parallel to the axis line, and a second insulator covering a side surface of the tooth part facing in the circumferential direction. The winding is wound around the connection part and the tooth part with the first insulator and the second insulator in between, the first insulator includes a first protruding part protruding beyond the curved surface, and a length from a position farthest from the curved surface, of the outer edge of the first protruding part to the curved surface is larger than five times a thickness of the second insulator.

According to the present invention, it is possible to prevent the winding disorder of the winding wound around the stator including the split core part having the curved surface at the corner between the inner circumferential surface of the yoke part and the side surface of the tooth part.

DETAILED DESCRIPTION

First Embodiment

Figure 1:
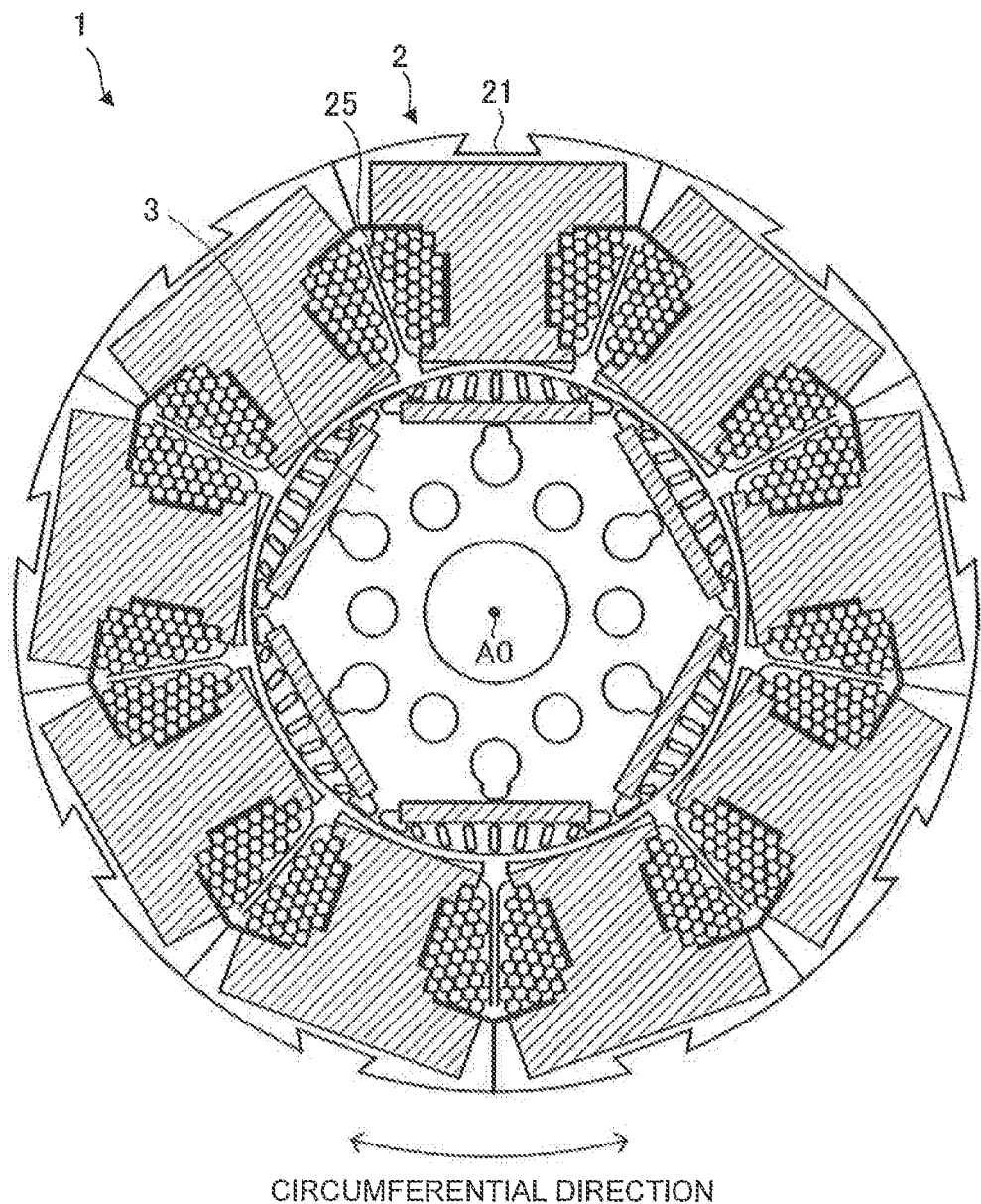
FIG. 1 is a cross-sectional view schematically illustrating an inner structure of a motor including a stator according to a first embodiment of the present invention.

FIG. 1 is a cross-sectional view schematically illustrating an inner structure of a motor 1 provided with a stator 2 according to a first embodiment of the present invention.

The motor 1 includes the stator 2 and a rotor 3. The motor 1 is a permanent magnet embedded motor, for example. The stator 2 includes a plurality of split core parts 21 arranged annularly in a circumferential direction around an axis line A0 (rotation center), and a winding 25.

The rotor 3 is supported rotatably around a rotation center line (axis line A0) which is the rotation center of the rotor 3, inside the stator 2 across an air gap in between. The air gap is formed between an outer circumferential surface of the rotor 3 and an inner circumferential surface of the stator 2. The air gap between the stator 2 and the rotor 3 is in a range of 0.3 mm to 1 mm, for example. Electric current of a frequency synchronized with a commanded rotation speed is applied to the stator 2, and thereby a rotating magnetic field is generated to rotate the rotor 3.

Figure 2:
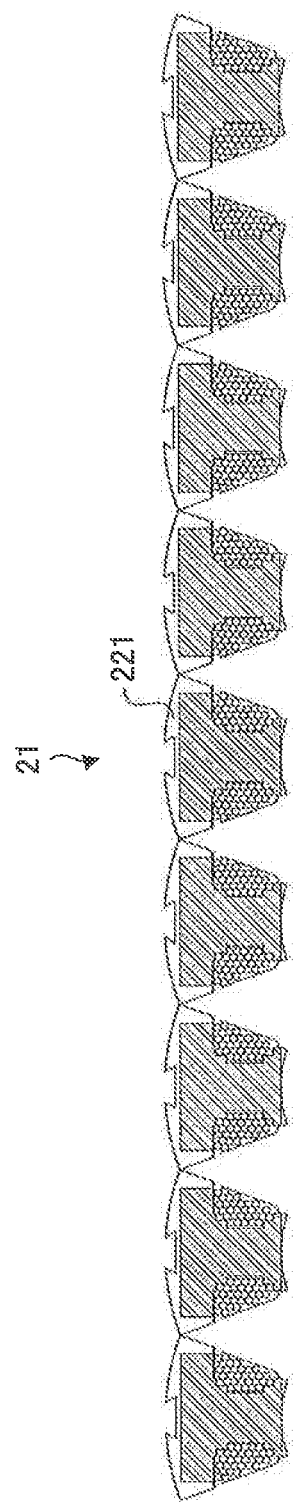
FIG. 2 is a cross-sectional view illustrating a plurality of split core parts in a state in which they are linked.

FIG. 2 is a cross-sectional view illustrating a state in which the plurality of split core parts 21 are linked.

For example, in a production process of the motor 1, the plurality of split core parts 21 linked to each other are folded annularly, in such a manner that respective yoke parts 221 form an outer circumference of the stator 2. The annular stator 2 illustrated in FIG. 1 is formed by inserting the rotor 3 into the annular stator 2 with the air gap in between.

Next, a structure of the split core part 21 will be described specifically.

Figure 3:
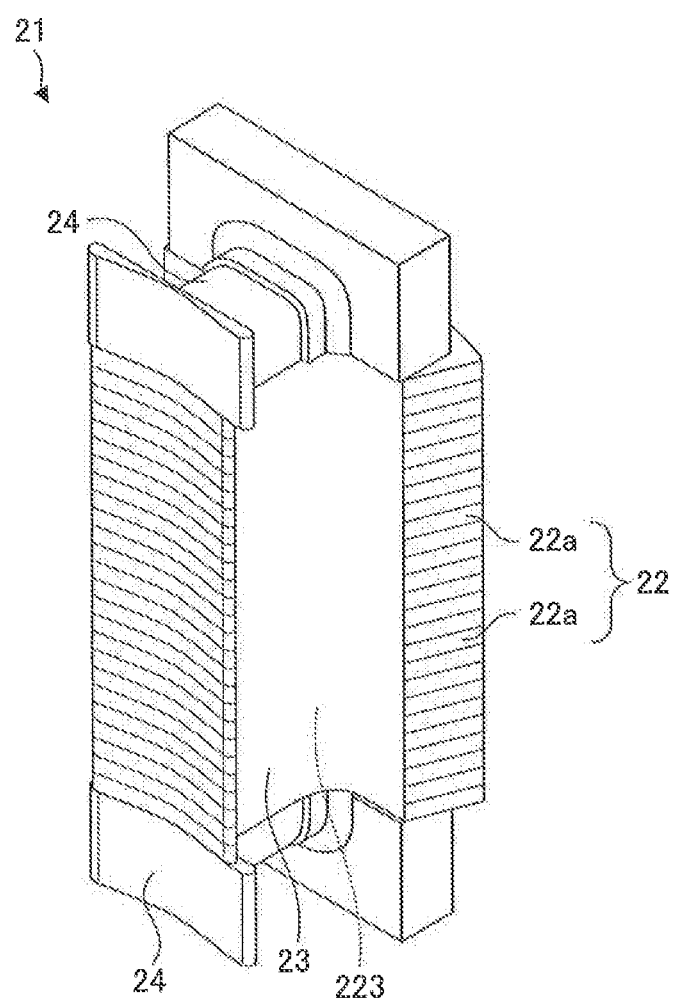
FIG. 3 is a perspective view schematically illustrating a structure of the split core part.

FIG. 3 is a perspective view schematically illustrating a structure of the split core part 21.

Each of the plurality of split core parts 21 includes a stator core 22, a coil bobbin 24 as insulator (first insulator), and an insulator 23 (second insulator).

The stator core 22 is formed by laminating a plurality of electromagnetic steel sheets 22a. Each of the electromagnetic steel sheets 22a is punched and formed into a substantially T shape, and has a thickness in a range of 0.1 mm to 0.7 mm, for example. In the present embodiment, the thickness of each of the electromagnetic steel sheets 22a is 0.35 mm. However, the number of stacked electromagnetic steel sheets and the shape and the thickness of each of the electromagnetic steel sheets 22a are not limited to those in the present embodiment. With regard to each of the electromagnetic steel sheets 22a, adjacent electromagnetic steel sheets 22a are fastened with each other by a caulked part 221b described later.

The insulator 23 is a thin PET (polyethylene terephthalate) film, for example. The thickness of the PET film is 0.15 mm, for example. The insulator 23 covers a side surface of a tooth part 223 facing in the circumferential direction of the stator 2.

The coil bobbins 24 are provided on both end parts of the stator core 22 in a direction (hereinafter, referred to as axis line direction.) parallel to the axis line A0. However, the coil bobbin 24 may be provided on one of the end parts of the stator core 22 in the axis line direction.

Figure 4:
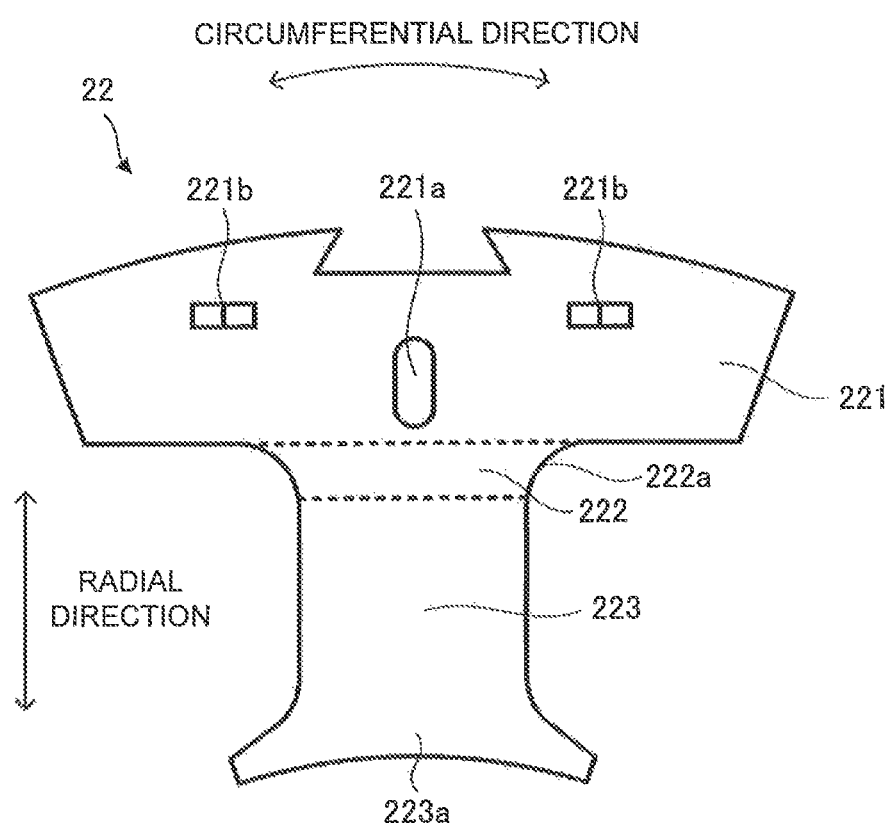
FIG. 4 is a plan view schematically illustrating a structure of a stator core.

FIG. 4 is a plan view schematically illustrating a structure of the stator core 22.

The stator core 22 includes the yoke part 221, a connection part 222, and the tooth part 223.

The yoke part 221 includes a hole 221a as a first engagement part, and the caulked part 221b.

The connection part 222 is a region between the yoke part 221 and the tooth part 223. In FIG. 4, a boundary between the connection part 222 and the yoke part 221 and a boundary between the connection part 222 and the tooth part 223 are indicated by dashed lines. The connection part 222 has curved surface 222a connecting the yoke part 221 and the tooth part 223. In other words, when the stator core 22 is seen in the axis line direction, the end portion of the connection part 222 in a direction perpendicular to the radial direction of the stator 2 (the corner between the inner circumferential surface of the yoke part 221 and the side surface of the tooth part 223) is shaped like circular arc. In the present embodiment, the radius of curvature of the curved surface 222a is 3.6 mm. It is desirable that the radius of curvature of the curved surface 222a be 2.5 mm or more and 5 mm or less. It is more desirable that the radius of curvature of the curved surface 222a be 3 mm or more and 4 mm or less. However, the radius of curvature of the curved surface 222a is not limited to these ranges.

The tooth part 223 extends in the radial direction toward the axis line A0 from the yoke part 221 (i.e., the inward direction of the radial direction of the stator 2). In other words, the tooth part 223 extends toward the axis line A0 (a rotation shaft 32 described later) of the rotor 3 from the yoke part 221. The tooth part 223 includes a tooth tip portion 223a at a tip portion in the radial direction of the stator 2. The width of the part other than the tooth tip portion 223a of the tooth part 223 is substantially uniform along the radial direction of the stator 2. The tooth tip portion 223a is formed to spread in an umbrella shape in the circumferential direction of the stator 2.

Figure 5:
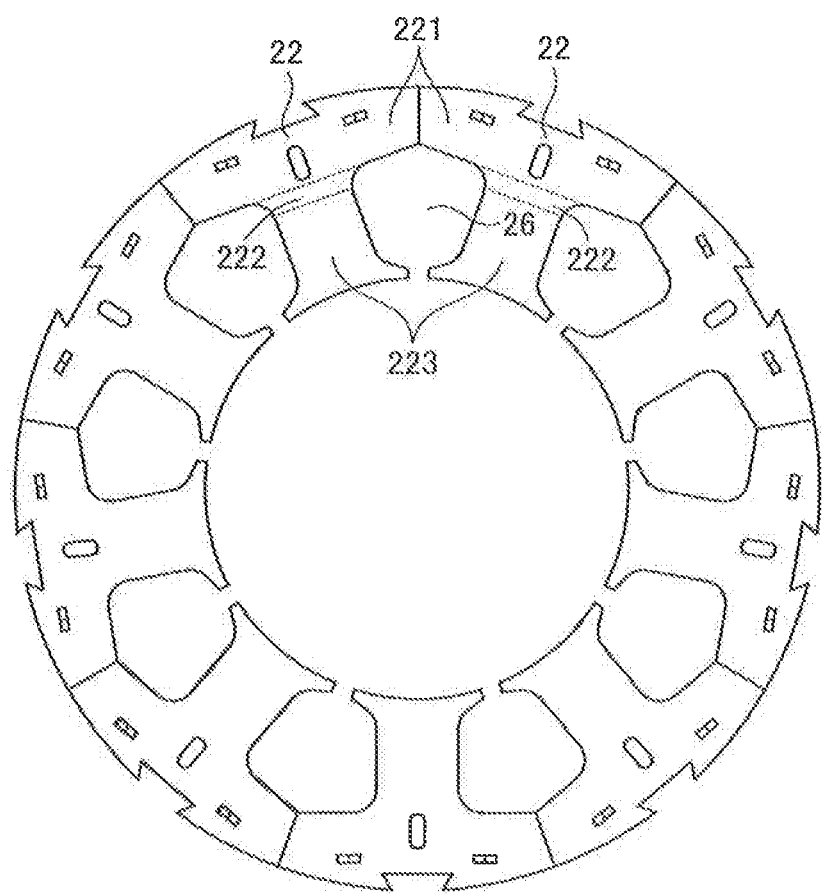
FIG. 5 is a plan view illustrating a state in which a plurality of stator cores are linked annularly.

FIG. 5 is a plan view illustrating a state in which a plurality of stator cores 22 are linked annularly. In the present embodiment, the stator cores 22 have the same structure as each other.

As illustrated in FIG. 5, the yoke parts 221 of the stator cores 22 adjacent on both sides are linked to each other, and thereby the adjacent stator cores 22 are linked to each other. That is, the stator cores 22 of the split core parts 21 adjacent on both sides are linked to each other, and thereby the split core parts 21 illustrated in FIG. 1 are linked to each other.

As illustrated in FIG. 5, in the two adjacent stator cores 22, the region surrounded by two yoke parts 221 and two tooth parts 223 is a slot part 26.

The tooth parts 223 of the plurality of stator cores 22 are adjacent with each other across slot parts 26. Thus, the plurality of tooth parts 223 and the plurality of slot parts 26 are alternatingly arranged in the circumferential direction of the stator 2. The arrangement pitch of the plurality of tooth parts 223 in the circumferential direction of the stator 2 (i.e., the width of the slot part 26 in the circumferential direction of the stator 2) is regular intervals.

The slot parts 26 are formed at substantially regular intervals along the circumferential direction of the stator 2, inside the stator 2. In the present embodiment, nine slot parts 26 are formed in the stator 2.

Figure 6:
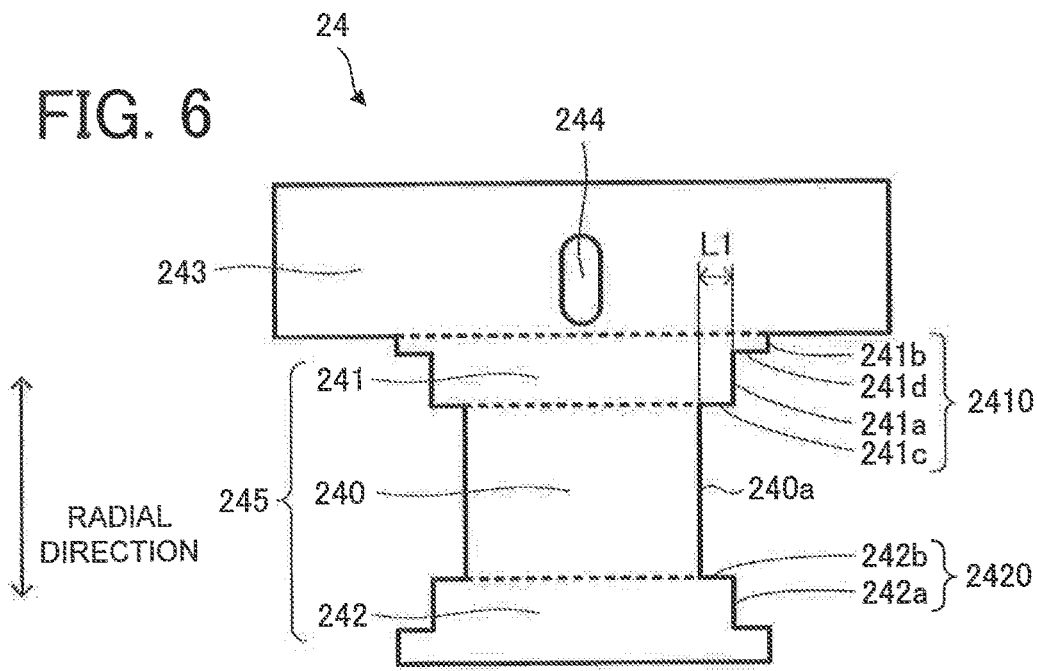
FIG. 6 is a plan view schematically illustrating a structure of a coil bobbin.

FIG. 6 is a plan view schematically illustrating a structure of the coil bobbin 24.

The coil bobbin 24 is provided on an end part of the tooth part 223 in the axis line direction. The coil bobbin 24 includes a winding supporting part 245 for supporting the winding 25. The winding supporting part 245 includes a main part 240, a first sub part 241, and a second sub part 242. As illustrated in FIG. 6, the coil bobbin 24 may further include a base part 243 and a protrusion 244 as a second engagement part.

The main part 240 includes a main-winding frame 240a for supporting the winding 25. A flat surface for supporting the winding 25 is formed on the main-winding frame 240a.

The first sub part 241 is a region adjacent to the main part 240. In FIG. 6, a boundary between the first sub part 241 and the main part 240, and a boundary between the first sub part 241 and the base part 243 are indicated by dashed lines. The first sub part 241 includes first protruding parts 2410 on both sides in the direction perpendicular to the radial direction of the stator 2. However, it is sufficient that the first protruding part 2410 is provided on one end in the direction perpendicular to the radial direction.

The first protruding part 2410 includes a first sub-winding frame 241a, a third sub-winding frame 241b, a first wall surface 241c, and a third wall surface 241d. The first wall surface 241c (a level difference) is formed by the main-winding frame 240a and the first sub-winding frame 241a. The third wall surface 241d (a level difference) is formed by the first sub-winding frame 241a and the third sub-winding frame 241b. Flat surfaces for supporting the winding 25 are formed on the first sub-winding frame 241a and the third sub-winding frame 241b. It is desirable that the flat surfaces formed on the first sub-winding frame 241a and the third sub-winding frame 241b be parallel to the flat surface formed on the main-winding frame 240a. Length L1 (maximum insulating distance) is a length from a position farthest from the curved surface 222a of the outer edge of the first protruding part 2410 to the curved surface 222a. In the present embodiment, the end portion of the first sub-winding frame 241a in the radial direction toward the axis line A0 is the position farthest from the curved surface 222a of the outer edge of the first protruding part 2410. In the present embodiment, L1 is 0.8 mm.

The second sub part 242 is a region adjacent to the main part 240 in the radial direction. In FIG. 6, a boundary between the second sub part 242 and the main part 240 is illustrated with a dashed line. The second sub part 242 includes second protruding parts 2420 on both sides in the direction perpendicular to the radial direction of the stator 2. However, it is sufficient that the second protruding part 2420 is provided on one end in the direction perpendicular to the radial direction.

The second protruding part 2420 includes a second sub-winding frame 242a and a second wall surface 242b. The second wall surface 242b (a level difference) is formed by the main-winding frame 240a and the second sub-winding frame 242a. A flat surface for supporting the winding 25 is formed on the second sub-winding frame 242a. It is desirable that the flat surface formed on the second sub-winding frame 242a be parallel to the flat surface formed on the main-winding frame 240a.

The protrusion 244 as the second engagement part engages with the hole 221a as the first engagement part of the yoke part 221. The protrusion 244 is inserted in the hole 221a, and thereby the coil bobbin 24 is positioned in relation to the stator core 22. It is sufficient that the first engagement part and the second engagement part are engaged or fitted with each other, and the shapes of the first engagement part and the second engagement part are not limited to those in the present embodiment.

Figure 7:
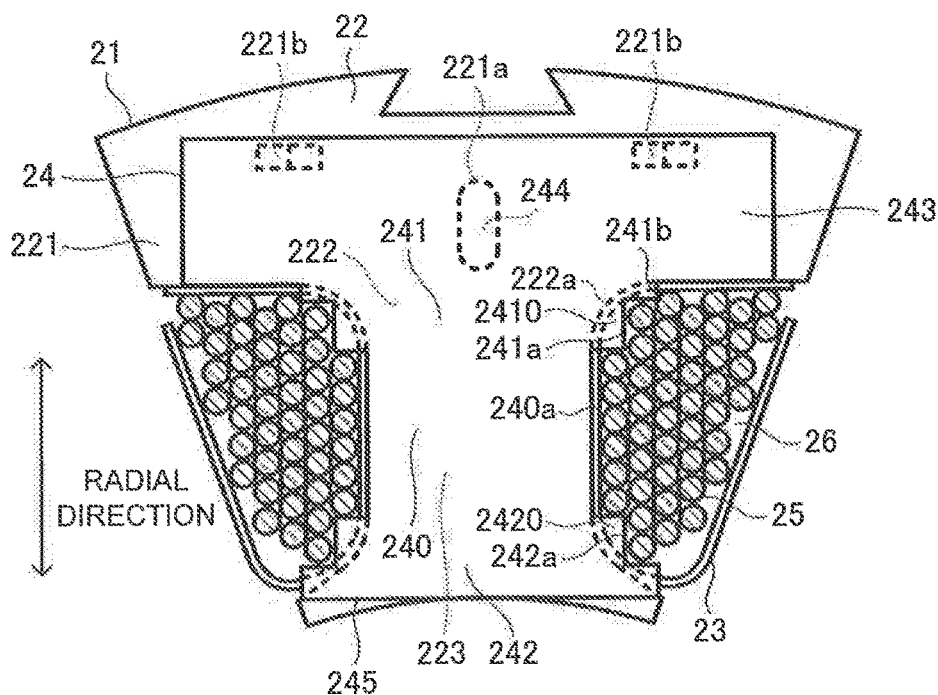
FIG. 7 is a cross-sectional view schematically illustrating a structure of the split core part around which a winding is wound.

FIG. 7 is a cross-sectional view schematically illustrating a structure of the split core part 21 in which the winding 25 is wound.

The coil bobbin 24 is provided on an end part of the stator core 22 in the axis line direction. Specifically, the main part 240 overlaps the tooth part 223. The first sub part 241 overlaps the connection part 222. The second sub part 242 overlaps the tip side of the tooth part 223 in the radial direction. The base part 243 overlaps the yoke part 221. However, the positional relationship between the coil bobbin 24 and the stator core 22 is not limited to the example illustrated in FIG. 7.

The winding 25 is wound around the connection part 222 and the tooth part 223 with the insulator 23 and the coil bobbin 24 in between, to form a coil for generating a rotating magnetic field. Specifically, the winding 25 is supported by the main-winding frame 240a, the first sub-winding frame 241a, the second sub-winding frame 242a, and the third sub-winding frame 241b. The insulator 23 are interposed between the tooth part 223 and the winding 25.

The winding 25 is a magnet wire, for example. In the present embodiment, the stator 2 has three phases, and wire connection of the winding 25 (coil) is Y-connection (star connection). The number of turns and the wire diameter of the winding 25 (coil) are set on the basis of rotation speed, torque, and voltage specification of the motor 1, the cross-sectional area of the slot part 26, etc. In the present embodiment, the wire diameter of the winding 25 is 1.0 mm. In the present embodiment, the winding 25 is wound 80 turns around the stator core 22. However, the wire diameter and the number of turns of the winding 25 are not limited to these examples.

In the present embodiment, the winding method of the winding 25 (coil) is concentrated winding. For example, the winding 25 can be wound around each of the stator cores 22, in a state before arranging the plurality of stator cores 22 annularly (for example, a state in which the split core parts 21 are arranged linearly as illustrated in FIG. 2). The plurality of stator cores 22 around which the winding 25 is wound are folded annularly and fixed annularly by welding or the like.

In the present embodiment, the winding 25 is supported by the main-winding frame 240a, the first sub-winding frame 241a, and the second sub-winding frame 242a. The first sub part 241 protrudes beyond the curved surface 222a in the circumferential direction of the stator 2. Specifically, the first protruding part 2410 protrudes beyond the curved surface 222a in the circumferential direction of the stator 2.

Thus, a gap is formed between the winding 25 supported by the first sub-winding frame 241a and the curved surface 222a.

It is desirable that the maximum insulating distance L1 (FIG. 6) be larger than five times the thickness of the insulator 23 (the length in the direction perpendicular to the radial direction of the stator 2). In other words, it is desirable that the level difference formed by the main-winding frame 240a and the first sub-winding frame 241a (i.e., the length of the first wall surface 241c in the direction perpendicular to the radial direction of the stator 2) be larger than five times the thickness of the insulator 23.

The second sub part 242 protrudes beyond the side surface of the tooth part 223 that faces in the circumferential direction of the stator 2. Specifically, the second protruding part 2420 protrudes beyond the tooth part 223 in the direction perpendicular to the radial direction.

Next, a structure of the rotor 3 will be described specifically.

Figure 8:
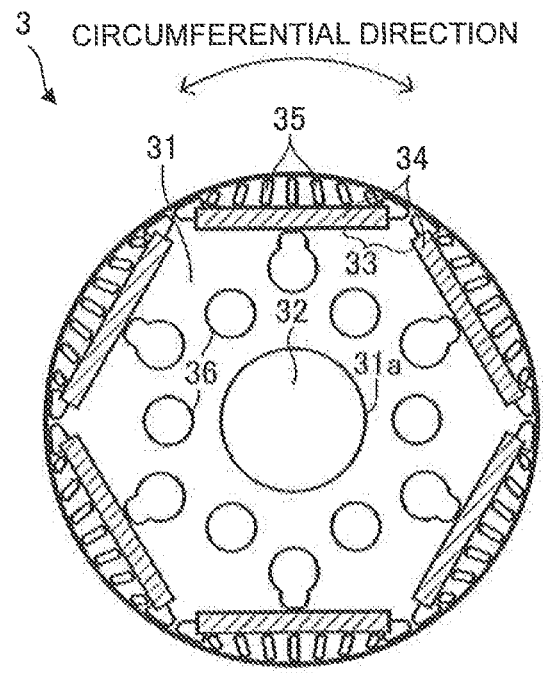
FIG. 8 is a cross-sectional view schematically illustrating a structure of a rotor.

FIG. 8 is a cross-sectional view schematically illustrating the structure of the rotor 3.

The rotor 3 includes a rotor core 31, a rotation shaft 32, a plurality of magnet insertion holes 33, a plurality of permanent magnets 34, a plurality of flux barriers 35 (leakage magnetic flux reducing holes), and a plurality of wind holes 36.

In the present embodiment, the rotor 3 is of a permanent magnet embedded type. In the inner area of the rotor core 31, the plurality of magnet insertion holes 33 are formed along the circumferential direction of the rotor 3 (the circumferential direction of the stator 2). The magnet insertion holes 33 are gaps into which the permanent magnets 34 are inserted. The plurality of permanent magnets 34 are disposed in the respective magnet insertion holes 33. The number of magnet insertion holes 33 (permanent magnets 34) corresponds to the number of magnetic poles of the rotor 3. In the present embodiment, the number of magnetic poles of the rotor 3 is six. However, the number of magnetic poles of the rotor 3 may be two or more.

The flux barriers 35 are formed at positions adjacent to the magnet insertion holes 33 in the circumferential direction of the rotor 3. The flux barriers 35 reduce leakage magnetic flux. It is desirable that the length between the flux barrier 35 and the outer circumferential surface of the rotor 3 be short, and the length is 0.35 mm for example. The wind holes 36 are through holes, and allow a refrigerant to pass through, for example.

The rotor core 31 is composed of a plurality of electromagnetic steel sheets that are laminated. The thickness of each of the electromagnetic steel sheets of the rotor core 31 is within a range of 0.1 mm to 0.7 mm. In the present embodiment, the thickness of each of the electromagnetic steel sheets of the rotor core 31 is 0.35 mm. However, the shape and the thickness of each of the electromagnetic steel sheets of the rotor core 31 are not limited. With regard to the electromagnetic steel sheets of the rotor core 31, adjacent electromagnetic steel sheets are fastened to each other by caulking.

The rotor core 31 is fitted with the rotation shaft 32. The rotation shaft 32 can be fixed to a shaft center portion 31a of the rotor core 31 by shrink fit, press fitting, or the like. The rotation shaft 32 fitted with the rotor core 31 is held at the center (near the rotation center position) of the stator 2 rotatably by a shaft bearing. The rotation shaft 32 transmits rotation energy to the rotor core 31.

The permanent magnets 34 are rare-earth magnets including neodymium (Nd), iron (Fe), and boron (B) as principal components, for example. The permanent magnets 34 are magnetized so that the magnetic field is oriented in the radial direction of the rotor 3. It is desirable that the residual magnetic flux density of the permanent magnets 34 at 20° C. be 1.27 T or more and 1.42 T or less. Further, it is desirable that the coercivity of the permanent magnets 34 at 20° C. be 1671 kA/m or more and 1922 kA/m or less.

The coercivity of Nd—Fe—B permanent magnets has a property of decreasing with temperature. For example, when a motor using Nd rare-earth magnets in a high-temperature atmosphere of 100° C. or more, such as a compressor, is utilized, the coercivity of the magnets degrades according to temperature (approximately −0.5 to −0.6%/AK), and thus it is necessary to improve the coercivity by adding the element Dy (dysprosium). The coercivity improves almost in proportion to the content of the element Dy. In a general compressor, the upper limit of the ambient temperature of the motor is approximately 150° C., and the general compressor is used in a range in which the temperature increases by approximately 130° C. from 20° C. For example, in a case of the temperature coefficient of −0.5%/AK, the coercivity decreases by 65%.

In order to prevent demagnetization at the maximum load of the compressor, the coercivity of approximately 1100 to 1500 A/m is necessary. In order to guarantee the coercivity in the ambient atmosphere of 150° C., it is necessary to design the ordinary-temperature coercivity to be approximately 1800 to 2300 A/m.

The ordinary-temperature coercivity is approximately 1800 A/m in a state in which the element Dy is not added to Nd—Fe—B permanent magnets. In order to obtain the coercivity of approximately 2300 kA/m, it is necessary to add the element Dy of approximately 2 wt %. However, if the element Dy is added, the coercivity property improves, but the residual magnetic flux density property deteriorates. If the residual magnetic flux density deteriorates, the magnet torque of the motor decreases, and the flowing electric current increases, and accordingly the copper loss increases. Hence, it is desired that the addition amount of the Dy be reduced, considering the motor efficiency.

First Variant Example

Figure 9:
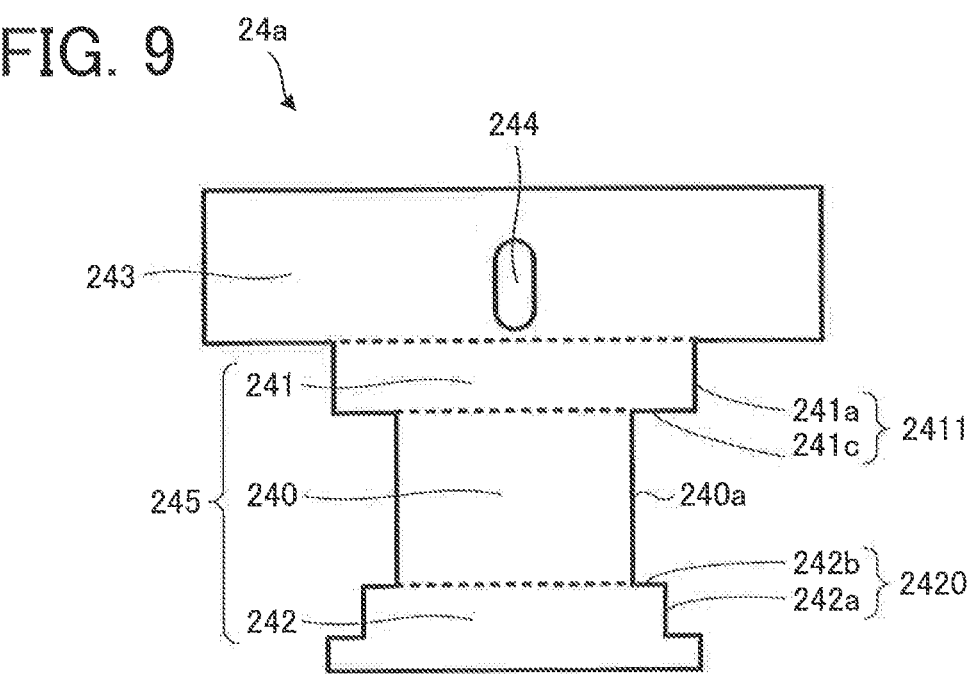
FIG. 9 is a plan view schematically illustrating a structure of a coil bobbin.

FIG. 9 is a plan view schematically illustrating a structure of a coil bobbin 24a.

Figure 10:
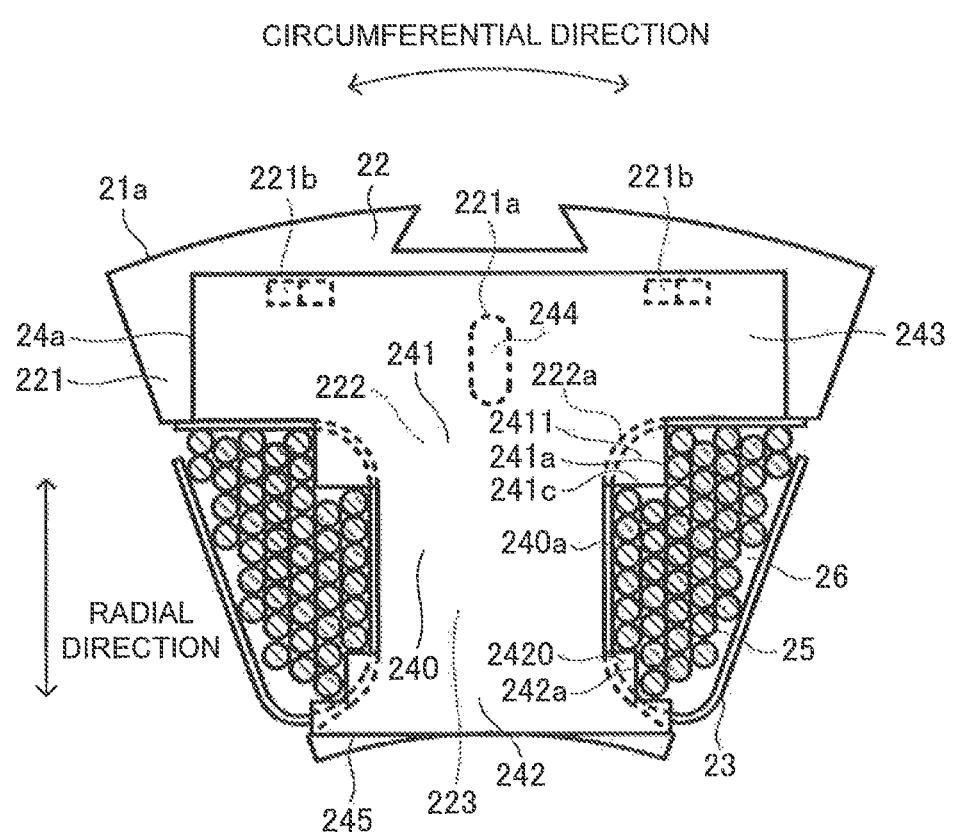
FIG. 10 is a cross-sectional view schematically illustrating a structure of a split core part around which a winding is wound.

FIG. 10 is a cross-sectional view schematically illustrating a structure of a split core part 21a in which the winding 25 is wound.

The first sub part 241 of the coil bobbin 24a includes first protruding part 2411. The structure of the first protruding part 2411 in the coil bobbin 24a differs from the structure of the first protruding part 2410 in the coil bobbin 24 (FIG. 6). The structure of the coil bobbin 24a is the same as the structure of the coil bobbin 24 illustrated in FIG. 6, except the structure of the first protruding part 2411.

The first protruding part 2411 includes a first sub-winding frame 241a and a first wall surface 241c. The first wall surface 241c (the level difference) is formed by the main-winding frame 240a and the first sub-winding frame 241a. That is, the first protruding part 2411 differs from the first protruding part 2410 in the coil bobbin 24 illustrated in FIG. 6 in that the first protruding part 2411 does not include the third sub-winding frame 241b and the third wall surface 241d.

The split core part 21a illustrated in FIG. 10 includes the stator core 22 and the coil bobbin 24a. The structure of the split core part 21a is the same as the structure of the split core part 21 illustrated in FIG. 7, except the structure of the first protruding part 2411 in the coil bobbin 24a.

Second Variant Example

Figure 11:
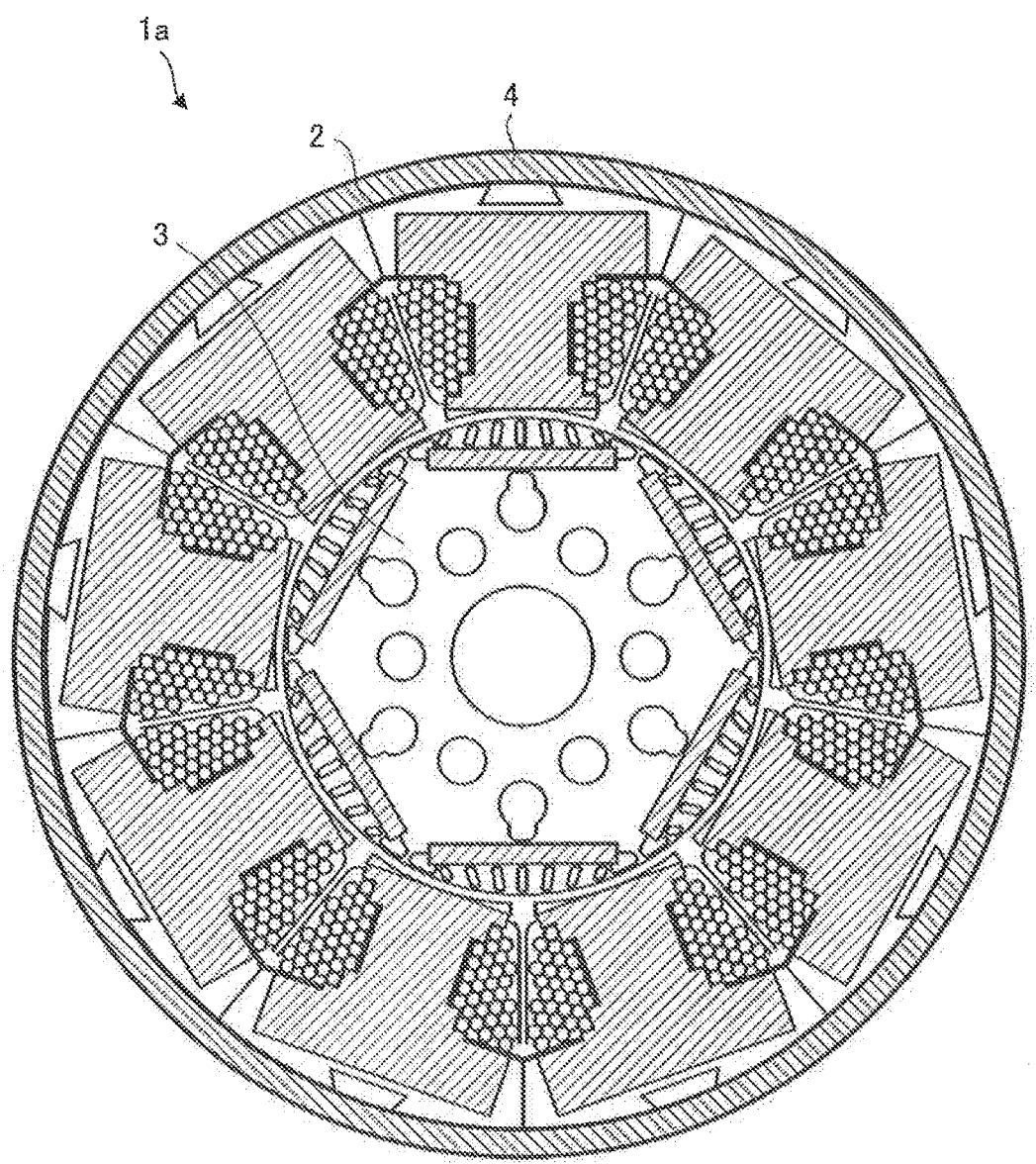
FIG. 11 is a cross-sectional view schematically illustrating an inner structure of a motor in which a stator and a rotor are fixed inside a housing.

FIG. 11 is a cross-sectional view schematically illustrating an inner structure of a motor 1a including the stator 2 and the rotor 3 fixed inside a housing 4.

As illustrated in FIG. 11, the motor 1a may further include the housing 4 (shell). For example, the annular stator 2 and the rotor 3 inside the stator 2 may be fixed inside the housing 4 by shrink fit.

The features in the first embodiment and each variant example described above can be combined with each other as appropriate.

The effect of the coil bobbin 24 (specifically, the first sub part 241) including the first protruding part 2410 that protrudes beyond the curved surface 222a will be described.

According to the first embodiment, the stator 2 is formed by the plurality of split core parts 21, and thus the winding 25 can be wound around the stator core 22 in a state in which the split core parts 21 are arranged linearly as illustrated in FIG. 2, for example. Thus, it is easy to wind the winding 25 around the split core part 21. However, in a motor provided with a stator using a stator core having corner forming a right angle between an inner circumferential surface of a yoke part and a side surface of a tooth part, a magnetic path is long at the corner of the stator core, the magnetic flux density is large, and thus an iron loss in the stator is easily caused. Hence, it is desirable that the part connecting the yoke part 221 and the tooth part 223 (the corner between the inner circumferential surface of the yoke part 221 and the side surface of the tooth part 223) be a curved surface, like the stator 2 in the first embodiment.

Figure 12:
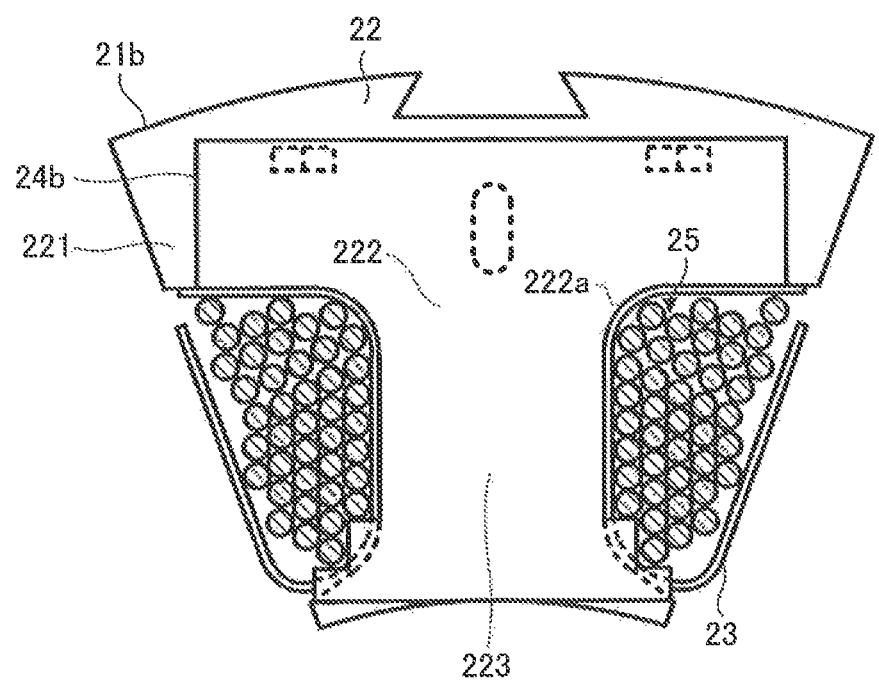
FIG. 12 is a cross-sectional view schematically illustrating a structure of a split core part as a comparative example, around which a winding is wound.

FIG. 12 is a cross-sectional view schematically illustrating a structure of a split core part 21b as a comparative example in which the winding 25 is wound.

In the split core part 21b as the comparative example, the connection part 222 includes the curved surface 222a connecting the yoke part 221 and the tooth part 223. That is, the part connecting the yoke part 221 and the tooth part 223 is the curved surface. However, the coil bobbin 24b provided in the split core part 21b does not include a protruding part protruding beyond the curved surface 222a. Hence, when the winding 25 is wound along the curved surface 222a of the stator core 22, it is difficult to align the winding 25 particularly on the curved surface 222a areas, as illustrated in FIG. 12. Thus, winding disorder of the winding 25 wound around the stator core 22 with the insulator 23 and the coil bobbin 24b in between occurs in regions near the curved surface 222a. As a result, the density (space factor) of the winding 25 is low in the regions near the curved surface 222a. That is, as in the comparative example illustrated in FIG. 12, even if the stator core 22 is a split core, it is difficult to align the winding 25, when the part connecting the yoke part 221 and the tooth part 223 is the curved surface.

On the other hand, according to the first embodiment, the coil bobbin 24 (specifically, the first sub part 241) includes the first protruding part 2410 protruding beyond the curved surface 222a as illustrated in FIG. 7. Accordingly, even when the part connecting the yoke part 221 and the tooth part 223 (the corner between the inner circumferential surface of the yoke part 221 and the side surface of the tooth part 223) is shaped like curved surface, the winding 25 can be easily aligned in the split core part 21, and the density of the winding 25 wound in the split core part 21 can be increased easily. In particular, in the region near the curved surface 222a, the winding 25 is supported by the first protruding part 2410, and thus the winding disorder of the winding 25 (coil) near the curved surface 222a can be prevented.

As described above, according to the present first embodiment, even when the corner between the inner circumferential surface of the yoke part 221 and the side surface of the tooth part 223 in the split core part 21 is the curved surface, the winding 25 can be aligned easily in the split core part 21, and the winding disorder of the winding 25 wound in the stator 2 can be prevented.

Since the winding 25 is aligned in each of the split core parts 21 of the stator 2, the density of the winding 25 in the stator 2 (in particular, near the curved surface 222a) can be increased, and the copper loss at the time of application of electric current can be reduced (the electrical resistance of the winding 25 can be reduced).

Further, according to the first embodiment, even when the corner between the inner circumferential surface of the yoke part 221 and the side surface of the tooth part 223 in the split core part 21 is the curved surface, the winding 25 is supported by the first protruding part 2410 particularly in the region near the curved surface 222a, and thus it becomes easier to wind the winding 25 of a large wire diameter (the winding having a small electrical resistance) on the split core part 21.

A gap is formed between the winding 25 supported by the first sub-winding frame 241a and the curved surface 222a, and thus the insulation property between the stator core 22 and the winding 25 near the curved surface 222a can be improved.

When the stator 2 is configured so that the maximum insulating distance L1 (FIG. 6) is larger than five-times the thickness of the insulator 23 in the direction perpendicular to the radial direction of the stator 2, the insulation property between the stator core 22 and the winding 25 near the curved surface 222a can be improved sufficiently.

Further, when a level difference is formed in the first protruding part 2410, it becomes easier to align the winding 25 in the split core part 21, and thus the winding disorder of the winding 25 (coil) particularly near the curved surface 222a can be prevented sufficiently.

Further, when the coil bobbin 24 includes the second protruding part 2420 protruding beyond the tooth part 223 in the direction perpendicular to the radial direction, it becomes easier to arrange and align the winding 25 in the split core part 21 even if a part near the tip portion of the tooth part 223 in the radial direction is a curved surface, for example, and thus the winding disorder of the winding 25 (coil) particularly near the tip portion in the radial direction of the tooth part 223 can be prevented sufficiently.

When the yoke part 221 includes the first engagement part and the coil bobbin 24 includes the second engagement part that engages with the first engagement part, the coil bobbin 24 can be easily positioned in relation to the stator core 22.

Next, the effect of the curved surface 222a included in the connection part 222 connecting the yoke part 221 and the tooth part 223 will be described.

Figure 13:
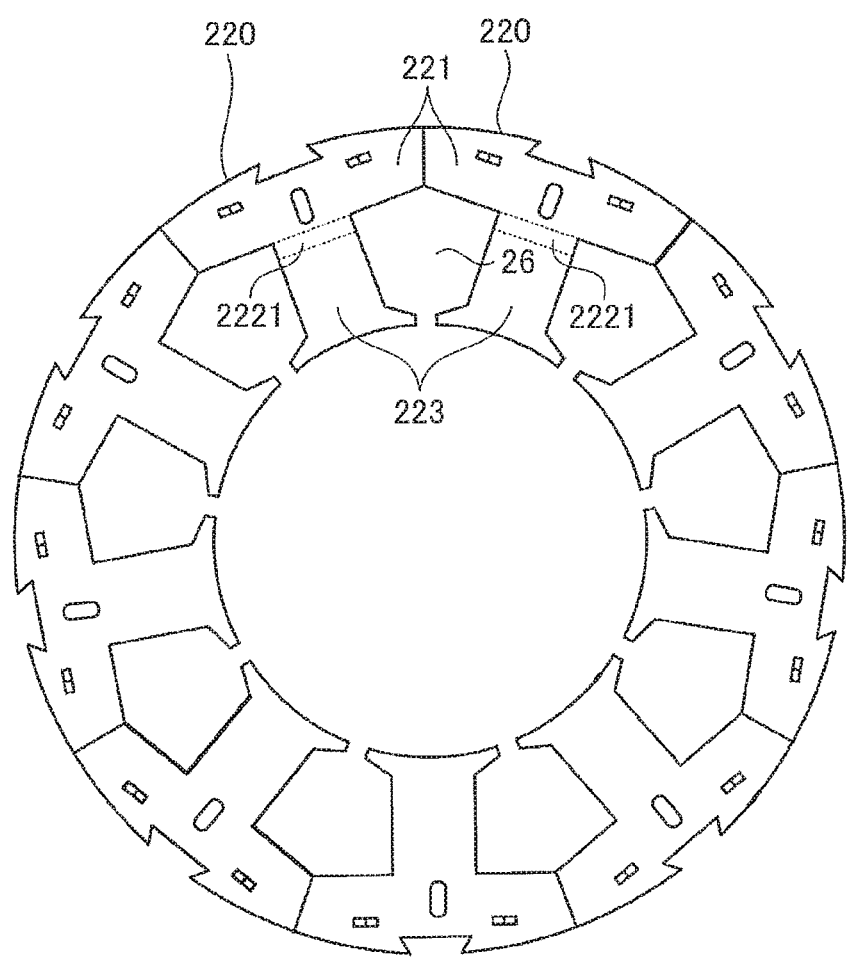
FIG. 13 is a plan view illustrating a state in which a plurality of stator cores as the comparative example are linked annularly.

FIG. 13 is a plan view illustrating a state in which a plurality of stator cores 220 as a comparative example are linked annularly. Each of the stator cores 220 has the same structure as each other.

Figure 14:
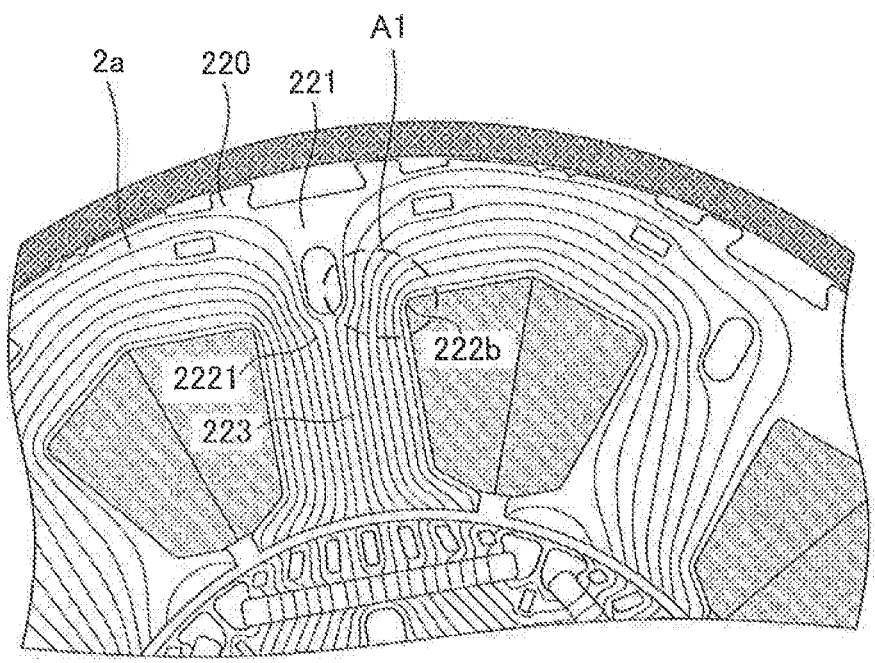
FIG. 14 is a diagram illustrating a magnetic circuit in the stator core when a stator using the stator core as the comparative example is installed in a motor.

FIG. 14 is a diagram illustrating a magnetic circuit in the stator 2a using the stator cores 220 when a stator 2a using the stator cores 220 as the comparative example is provided in the motor.

Figure 15:
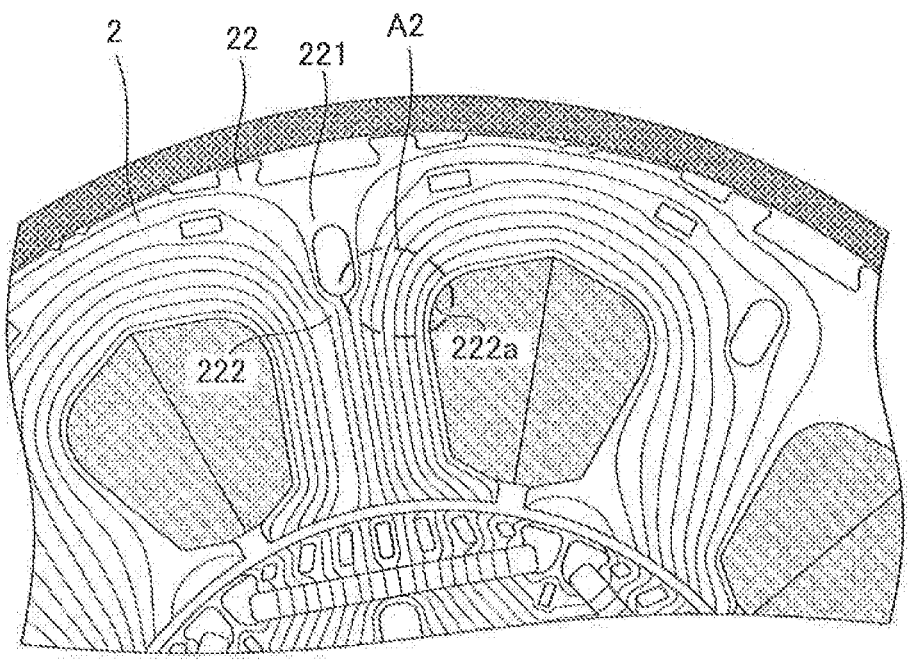
FIG. 15 is a diagram illustrating a magnetic circuit in the stator core when the stator according to the first embodiment is installed in a motor.

FIG. 15 is a diagram illustrating a magnetic circuit in the stator cores 22 when the stator 2 according to the first embodiment is provided in the motor. In FIGS. 14 and 15, a plurality of magnetic fluxes (magnetic field lines) in the stator cores 220 and 22 are indicated by fine lines respectively.

As illustrated in FIG. 13, each of the stator cores 220 as the comparative example is formed so that an end portion 222b of a connection part 2221 in the direction perpendicular to the radial direction of the stator 2 (corner between the inner circumferential surface of the yoke part 221 and the side surface of the tooth part 223) is substantially right angle when the stator core 220 is seen in the axis line direction.

As illustrated in FIG. 14, the length of the magnetic circuit (the length of the magnetic path) in the stator core 220 of the stator 2a according to the comparative example is longer than the length of the magnetic circuit in the stator core 22 of the stator 2 according to the first embodiment. This is because the end portion 222b of the connection part 2221 in the stator core 220 is formed to form substantially right angle. Hence, the magnetic flux density is large in a region (a region A1 surrounded by a dashed line) near the boundary between the yoke part 221 and the connection part 2221, as compared with the stator 2 according to the first embodiment.

On the other hand, as illustrated in FIG. 15, the length of the magnetic circuit in the stator core 22 of the stator 2 according to the first embodiment is shorter than the length of the magnetic circuit in the stator core 220 of the stator 2a according to the comparative example. This is because the end portion of the connection part 222 in the stator core 22 (the corner between the inner circumferential surface of the yoke part 221 and the side surface of the tooth part 223) is shaped like circular arc (i.e., the connection part 222 includes the curved surface 222a.). Hence, the magnetic flux density is small in a region (a region A2 surrounded by a dashed line) near the boundary between the yoke part 221 and the connection part 222, as compared with the stator 2a as the comparative example. As a result, in the stator 2 according to the first embodiment, the magnetic flux density near the region A2 is reduced, and thus the iron loss can be reduced.

As described above, since the connection part 222 of the stator core 22 includes the curved surface 222a, the iron loss is reduced and thus the motor efficiency (the rate of machine output to input electric power) is improved.

Figure 16:
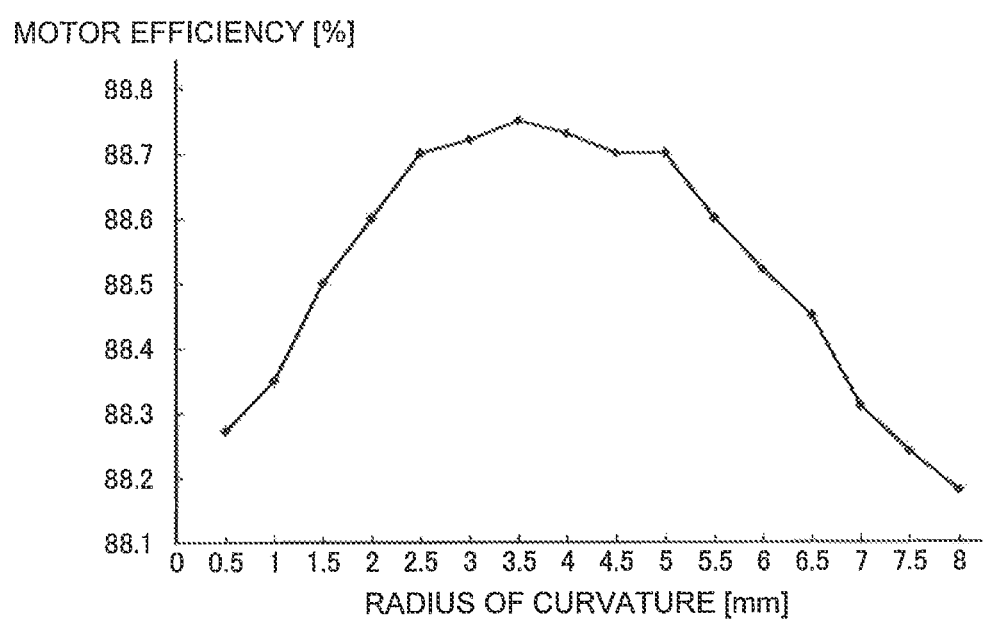
FIG. 16 is a diagram illustrating a relationship between a radius of curvature of a curved surface in a connection part of a stator core and motor efficiency.

FIG. 16 is a diagram illustrating a relationship between the radius of curvature of the curved surface 222a in the connection part 222 of the stator core 22 and the motor efficiency. The graph illustrated in FIG. 16 indicates a result of measuring the motor efficiency of the motor provided with the stator 2 according to the first embodiment. The horizontal axis of FIG. 16 represents the radius of curvature [mm] of the curved surface 222a, and the vertical axis represents the motor efficiency [%].

An effect of reducing iron loss is obtained by increasing the radius of curvature of the curved surface 222a. However, when the radius of curvature of the curved surface 222a is too large, the region for winding the winding 25 becomes narrow. As illustrated in FIG. 16, when the radius of curvature of the curved surface 222a is in the range of 2.5 mm or more and 5 mm or less, the motor efficiency is 88.7% or more, indicating that the motor efficiency is favorable. That is, in this range, it is possible to prevent the decrease of the motor efficiency caused by the copper loss and the iron loss. When the radius of curvature of the curved surface 222a is in the range of 3 mm or more and 4 mm or less, the motor efficiency is further improved.

Next, another effect of the curved surface 222a included in the connection part 222 of the stator core 22 will be described.

Figure 17:
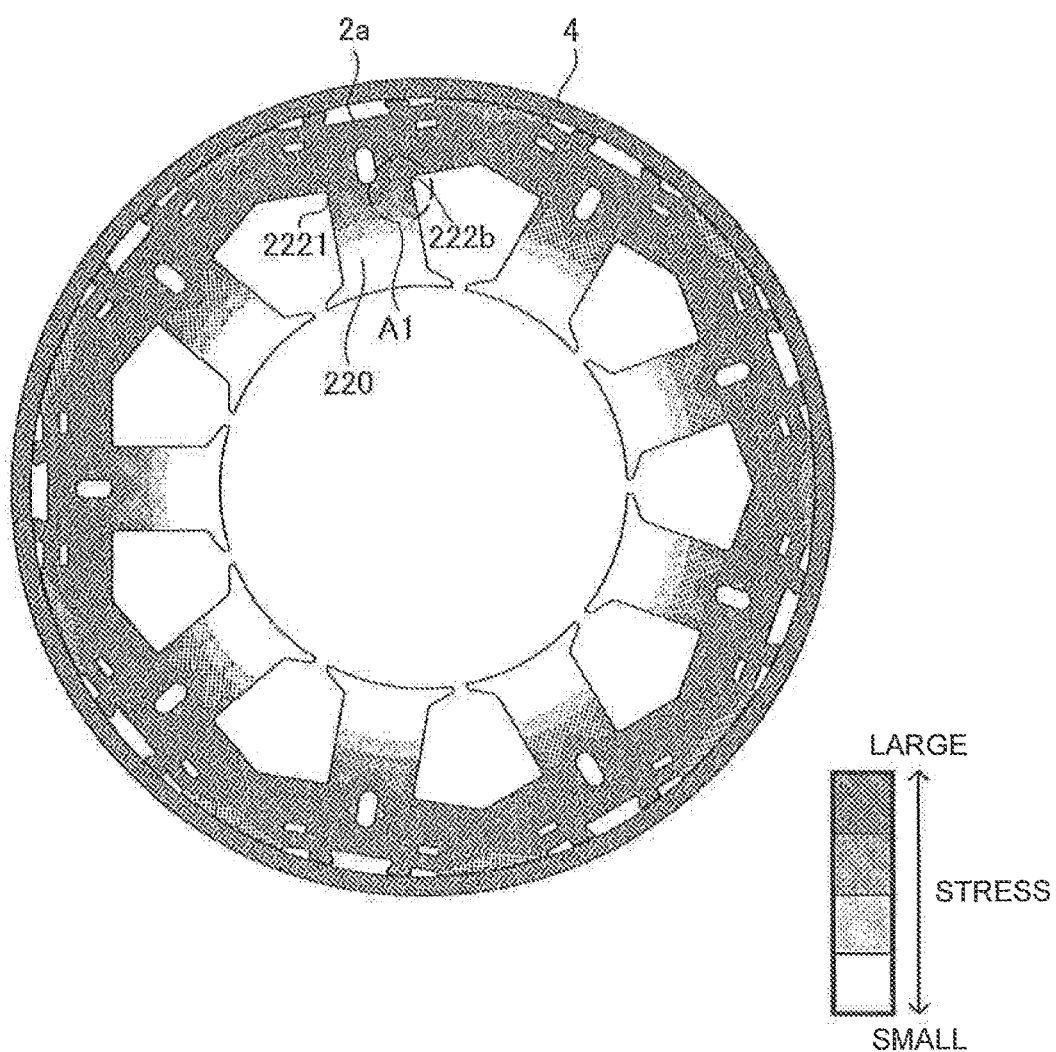
FIG. 17 is a diagram illustrating a stress distribution in the stator cores of the stator according to the comparative example when the stator is fitted in a housing by shrink fit.

FIG. 17 is a diagram illustrating a stress distribution in the stator cores 220 of the stator 2a according to the comparative example when the stator is fitted in the housing 4 by shrink fit.

Figure 18:
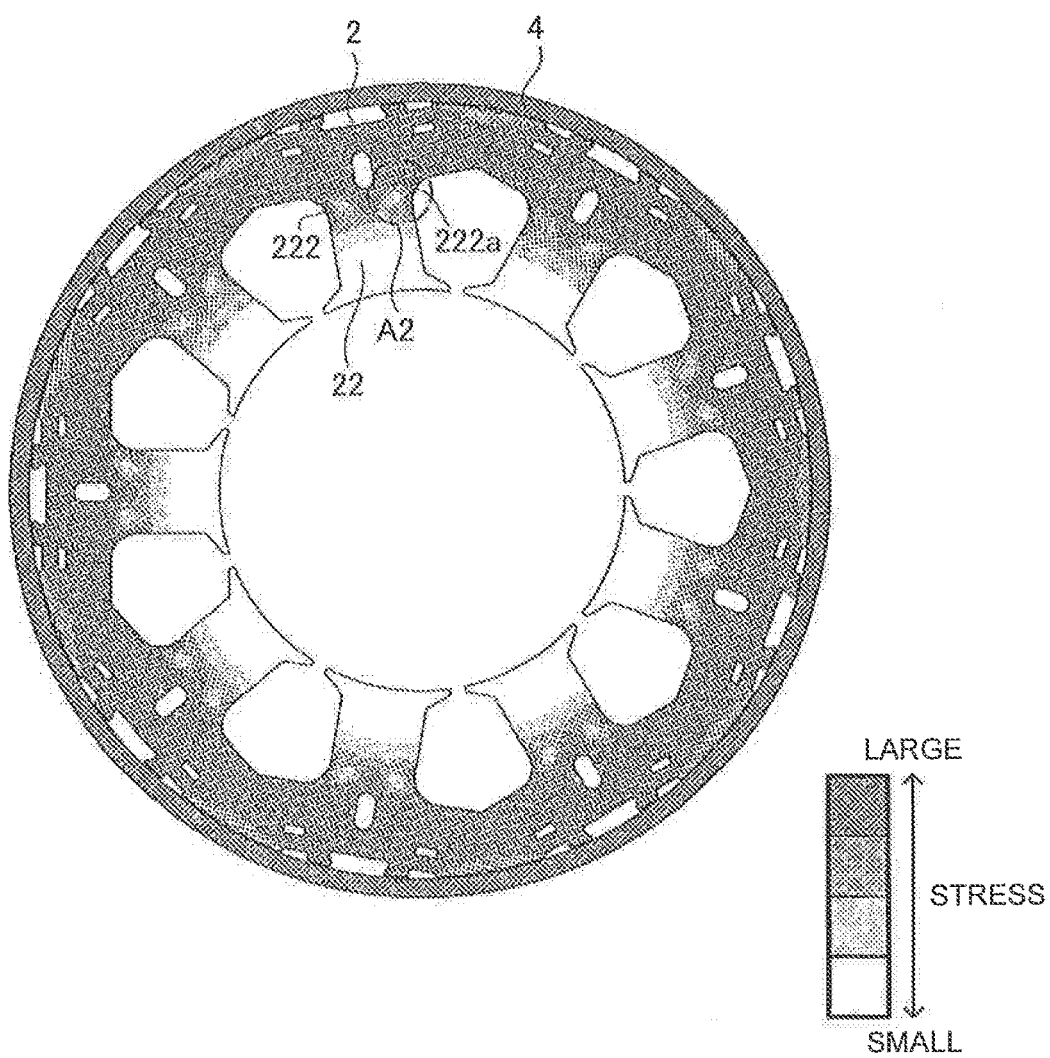
FIG. 18 is a diagram illustrating a stress distribution in the stator cores of the stator according to the first embodiment when the stator is fitted in a housing by shrink fit.

FIG. 18 is a diagram illustrating a stress distribution in the stator cores 22 of the stator 2 according to the first embodiment when the stator is fitted in the housing 4 by shrink fit.

As illustrated in FIG. 17, the stress near the region A1 in the stator core 220 of the stator 2a according to the comparative example is larger than the stress near the region A2 in the stator core 22 of the stator 2 according to the first embodiment. This is because the end portion 222b of the connection part 2221 in the stator core 220 is formed to form substantially right angle. When the stress in the stator core 22 is large, the degradation (for example, the degradation of the magnetic property) of the stator 2 (specifically, the stator core 22) easily occurs.

On the other hand, as illustrated in FIG. 18, the stress near the region A2 in the stator core 22 of the stator 2 according to the first embodiment is smaller than the stress near the region A1 in the stator core 220 of the stator 2a according to the comparative example. This is because the end portion of the connection part 222 in the stator core 22 is shaped like circular arc (i.e., the connection part 222 includes the curved surface 222a.). As a result, in the stator 2 according to the first embodiment, the stress near the region A2 is reduced, and thus the degradation (for example, decrease of magnetic permeability, iron loss, etc.) of the stator 2 (specifically, the stator core 22) can be reduced.

According to the first variant example, the structure of the coil bobbin 24a can be made simple and the same effect as the stator 2 according to the first embodiment is obtained.

Further, according to the first embodiment and the variant examples, by installing the stator 2 according to the first embodiment (including the variant examples) in the motor 1, it is possible to increase the density of the winding 25 in the stator 2, and thus it is possible to obtain the motor 1 that is small in size and satisfactory in the motor efficiency.

The permanent magnets 34 of the rotor 3 are rare-earth magnets including neodymium, iron, and boron as principal components, the residual magnetic flux density of the permanent magnets 34 at 20° C. is 1.27 T or more and 1.42 T or less, and the coercivity of the permanent magnets 34 at 20° C. is 1671 kA/m or more and 1922 kA/m or less. Accordingly, the magnetic flux density of the permanent magnets 34 becomes higher and the magnetic flux amount in the stator 2 increases. As a result, the torque of the motor 1 can be increased.

Further, as described in the second variant example, even when the stator 2 (including the variant example) and the rotor 3 are fitted in the housing 4 in the motor 1, the stress near the region A2 is relaxed in the stator 2, and thus the degradation of the motor 1 (specifically, the stator core 22) can be reduced.

Second Embodiment

Next, a compressor 100 provided with the motor 1 described in the first embodiment (including each variant example) will be described.

Figure 19:
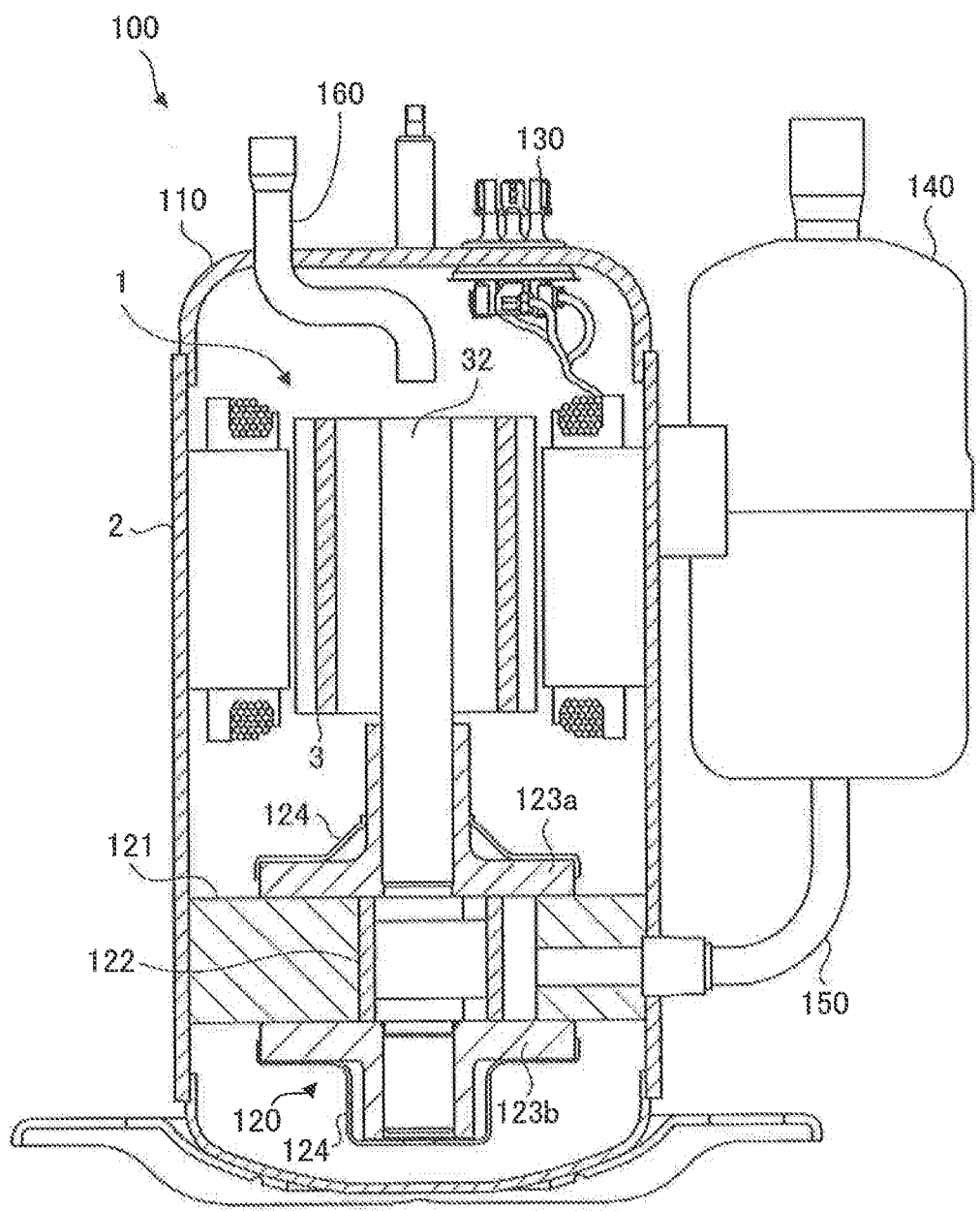
FIG. 19 is a cross-sectional view schematically illustrating a structure of a compressor according to a second embodiment of the present invention.

FIG. 19 is a cross-sectional view schematically illustrating a structure of the compressor 100 according to a second embodiment of the present invention.

In the present embodiment, the compressor 100 is a rotary compressor. However, the compressor 100 is not limited to the rotary compressor. The compressor 100 includes the motor 1 (an electromotive element), a sealed container 110 as a frame, and a compression mechanism 120 (a compression element). The sealed container 110 contains the motor 1 and the compression mechanism 120. Refrigerant oil for lubricating sliding parts of the compression mechanism 120 is accumulated in the bottom of the sealed container 110.

The compressor 100 further includes a glass terminal 130 fixed to the sealed container 110, an accumulator 140, a suction pipe 150, and a discharge pipe 160.

In the present embodiment, the motor 1 is a permanent magnet embedded motor, but is not limited thereto. The compression mechanism 120 includes a cylinder 121, a piston 122, an upper frame 123a (a first frame), a lower frame 123b (a second frame), and a plurality of mufflers 124 provided on each of the upper frame 123a and the lower frame 123b. The compression mechanism 120 further includes a vane that divides the inside of the cylinder 121 into a suction side and a compression side. The compression mechanism 120 is driven by the motor 1.

The stator 2 of the motor 1 is directly attached to the sealed container 110 by a method such as shrink fit and welding. Electric power is supplied to the coil of the motor 1 (specifically, the stator 2) via the glass terminal 130.

The rotor 3 of the motor 1 is held rotatably by the upper frame 123a and the lower frame 123b with bearings provided on each of the upper frame 123a and the lower frame 123b.

The rotation shaft 32 penetrates the piston 122. The rotation shaft 32 rotatably penetrates the upper frame 123a and the lower frame 123b. The upper frame 123a and the lower frame 123b cover end faces of the cylinder 121. The accumulator 140 supplies refrigerant gas to the cylinder 121 via the suction pipe 150.

Next, the operation of the compressor 100 will be described. The refrigerant (for example, refrigerant gas) supplied from the accumulator 140 is suctioned into the cylinder 121 from the suction pipe 150 fixed to the sealed container 110. The motor 1 rotates by applying the current to an inverter, and thus the piston 122 fitted with the rotation shaft 32 rotates in the cylinder 121. Accordingly, the refrigerant is compressed in the cylinder 121. After passing through the mufflers 124, the refrigerant rises inside the sealed container 110. At the time, refrigerant oil is mixed in the compressed refrigerant. When the mixture of the refrigerant and the refrigerant oil passes through the wind holes 36 formed on the rotor core 31, separation of the refrigerant and the refrigerant oil is promoted, and the refrigerant oil can be prevented from flowing into the discharge pipe 160. In this way, the compressed refrigerant is supplied to the high pressure side of the refrigeration cycle through the discharge pipe 160 provided in the sealed container 110.

R410A, R407C, R22, etc. can be used as the refrigerant for the compressor 100. However, the refrigerant for the compressor 100 is not limited to these, but a low global warming potential (low-GWP) refrigerant or the like can also be applied.

Representative examples of the low GWP refrigerant are the following refrigerants.

(1) A halogenated hydrocarbon including a double bond of carbon in the composition is HFO-1234yf (CF3CF=CH2), for example. HFO is the abbreviation of Hydro-Fluoro-Olefin. Olefin is an unsaturated hydrocarbon including one double bond. The GWP of HFO-1234yf is four.

(2) A hydrocarbon including a double bond of carbon in the composition is R1270 (propylene), for example. The GWP of R1270 is three, which is smaller than the GWP of HFO-1234yf, but the combustibility of R1270 is better than the combustibility of HFO-1234yf.

(3) A mixture that includes at least one of the halogenated hydrocarbon including the double bond of carbon in the composition and the hydrocarbon including the double bond of carbon in the composition is a mixture of HFO-1234yf and R32, for example, or the like. Since HFO-1234yf is a low-pressure refrigerant, a pressure loss increases, and the performance of the refrigeration cycle (particularly, in the evaporator) tends to decrease. Hence, it is desirable to use a mixture with R32, R41, or the like that is high-pressure refrigerant.

The compressor 100 according to the second embodiment has the following effect, in addition to the effects described in the first embodiment.

The compressor 100 according to the second embodiment is provided with the motor 1 that is satisfactory in the motor efficiency, and therefore it is possible to provide the compressor 100 achieving high compression efficiency (the ratio of actual workload necessary for compressing the refrigerant to theoretically calculated workload).

Third Embodiment

Next, a refrigerating and air-conditioning apparatus 300 provided with the compressor 100 according to the above second embodiment will be described.

Figure 20:
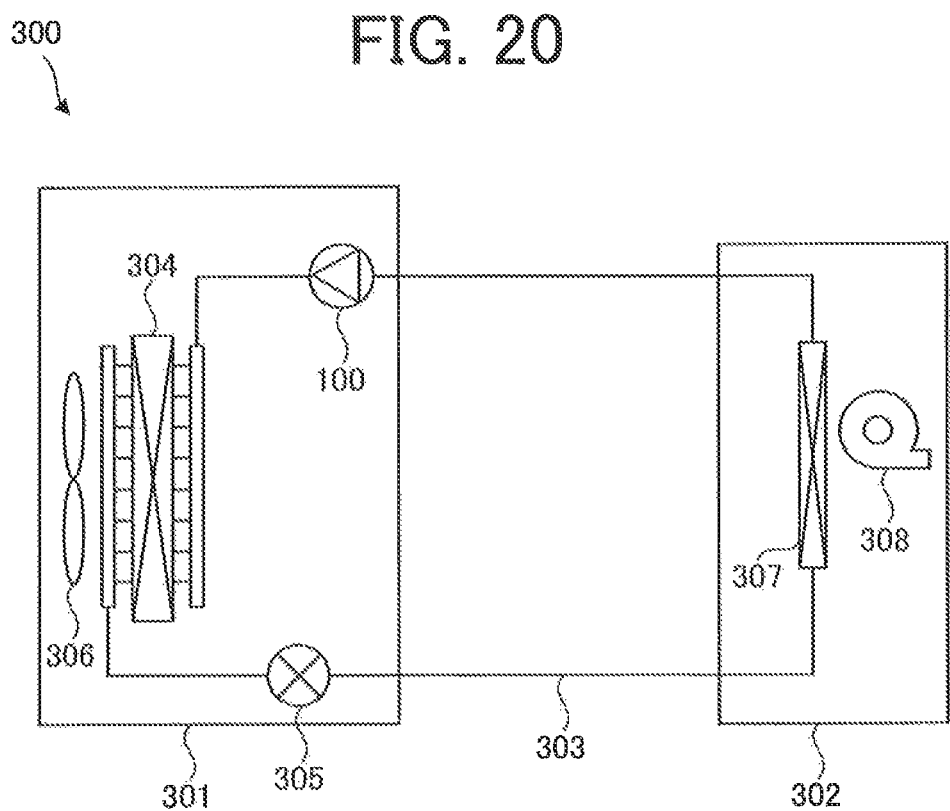
FIG. 20 is a diagram schematically illustrating a configuration of a refrigerating and air-conditioning apparatus according to a third embodiment of the present invention.

FIG. 20 is a diagram schematically illustrating a configuration of the refrigerating and air-conditioning apparatus 300 according to a third embodiment of the present invention. The refrigerating and air-conditioning apparatus 300 is an air conditioner that is capable of air heating and cooling operation, for example. The refrigerant circuit diagram illustrated in FIG. 20 is an example of a refrigerant circuit diagram of the air conditioner capable of air cooling operation.

The refrigerating and air-conditioning apparatus 300 according to the third embodiment includes an outdoor unit 301, an indoor unit 302, and a refrigerant pipe 303 for connecting the outdoor unit 301 and the indoor unit 302 and forming the refrigerant circuit (the refrigeration circuit).

The outdoor unit 301 includes the compressor 100, a condenser 304, a throttle device 305, and an outdoor blower 306 (a first blower). The condenser 304 condenses the refrigerant compressed by the compressor 100. The throttle device 305 depressurizes the refrigerant condensed by the condenser 304 and controls the flow rate of the refrigerant.

The indoor unit 302 includes an evaporator 307 and an indoor blower 308 (a second blower). The evaporator 307 evaporates the refrigerant depressurized by the throttle device 305 and cools indoor air.

Next, a basic operation of the cooling operation in the refrigerating and air-conditioning apparatus 300 will be described. In the cooling operation, the refrigerant is compressed by the compressor 100 and flows into the condenser 304. The refrigerant is condensed by the condenser 304, and the condensed refrigerant flows into the throttle device 305. The refrigerant is depressurized by the throttle device 305, and the depressurized refrigerant flows into the evaporator 307. The refrigerant evaporates in the evaporator 307 and becomes the refrigerant gas, and the refrigerant gas flows into the compressor 100 of the outdoor unit 301 again. The outdoor blower 306 sends the outdoor air to the condenser 304; the indoor blower 308 sends the indoor air to the evaporator 307; and thereby heat is exchanged between the refrigerant and the air.

The configuration and the operation of the refrigerating and air-conditioning apparatus 300 described above is an example and is not limited to the above example.

The refrigerating and air-conditioning apparatus 300 according to the third embodiment has the following effect in addition to the effects described in the first and second embodiments.

The refrigerating and air-conditioning apparatus 300 according to the third embodiment is provided with the compressor 100 achieving high compression efficiency, and thus the highly efficient refrigerating and air-conditioning apparatus 300 can be provided.

Although in the above the detail of the present invention has been described specifically with reference to the preferable embodiments, it is obvious that a skilled person can employ various modified modes on the basis of the basic technical idea and teaching of the present invention.

What is claimed is:

1. A stator comprising:
a winding; and
a plurality of split core parts arranged annularly in a circumferential direction around an axis line, each of the plurality of split core parts including:
a yoke part,
a tooth part extending in a radial direction toward the axis line from the yoke part,
a connection part including a curved surface connecting the yoke part and the tooth part,
a first insulator having an outer edge and provided on an end part of the tooth part in an axis line direction parallel to the axis line, and
a second insulator covering a side surface of the tooth part facing in the circumferential direction, wherein
the winding is wound around the connection part and the tooth part with the first insulator and the second insulator in between,
the first insulator includes a first protruding part protruding beyond the curved surface, and
a length from a position farthest from the curved surface, of the outer edge of the first protruding part to the curved surface is larger than five times a thickness of the second insulator.

2. The stator according to claim 1, wherein the first protruding part includes a first sub-winding frame supporting the winding.

3. The stator according to claim 2, wherein a gap is formed between the winding supported by the first sub-winding frame and the curved surface.

4. The stator according to claim 2, wherein
the first protruding part further includes a third sub-winding frame, and
a level difference is formed by the first sub-winding frame and the third sub-winding frame.

5. The stator according to claim 1, wherein the first insulator includes a second protruding part protruding beyond the tooth part in a direction perpendicular to the radial direction.

6. The stator according to claim 5, wherein the second protruding part includes a second sub-winding frame supporting the winding.

7. The stator according to claim 1, wherein
the yoke part includes a first engagement part, and
the first insulator includes a second engagement part engaging with the first engagement part.

8. The stator according to claim 1, wherein a radius of curvature of the curved surface of the connection part is 2.5 mm or more and 5 mm or less.

9. A motor comprising:
a stator including a plurality of split core parts arranged annularly in a circumferential direction around an axis line, and a winding; and
a rotor supported rotatably inside the stator,
each of the plurality of split core parts including:
a yoke part,
a tooth part extending in a radial direction toward the axis line from the yoke part,
a connection part including a curved surface connecting the yoke part and the tooth part,
a first insulator having an outer edge and provided on an end part of the tooth part in an axis line direction parallel to the axis line, and
a second insulator covering a side surface of the tooth part facing in the circumferential direction, wherein
the winding is wound around the connection part and the tooth part with the first insulator and the second insulator in between,
the first insulator includes a protruding part protruding beyond the curved surface, and
a length from a position farthest from the curved surface, of the outer edge of the protruding part to the curved surface is larger than five times a thickness of the second insulator.

10. The motor according to claim 9, wherein
the rotor includes a permanent magnet,
the permanent magnet is a rare-earth magnet including neodymium, iron, and boron as principal components,
residual magnetic flux density of the permanent magnet at 20° C. is 1.27 T or more and 1.42 T or less, and
coercivity of the permanent magnet at 20° C. is 1671 kA/m or more and 1922 kA/m or less.

11. The motor according to claim 9, further comprising a housing, wherein
the stator is fixed in the housing by shrink fit.

12. A compressor comprising:
a motor;
a compression mechanism driven by the motor; and
a sealed container containing the motor and the compression mechanism,
the motor including:
a stator including a plurality of split core parts arranged annularly in a circumferential direction around an axis line, and a winding, and
a rotor supported rotatably inside the stator,
each of the plurality of split core parts including:
a yoke part,
a tooth part extending in a radial direction toward the axis line from the yoke part,
a connection part including a curved surface connecting the yoke part and the tooth part,
an first insulator having an outer edge and provided on an end part of the tooth part in an axis line direction parallel to the axis line, and
a second insulator covering a side surface of the tooth part facing in the circumferential direction, wherein
the winding is wound around the connection part and the tooth part with the first insulator and the second insulator in between,
the first insulator includes a protruding part protruding beyond the curved surface, and
a length from a position farthest from the curved surface, of the outer edge of the protruding part to the curved surface is larger than five times a thickness of the second insulator.

13. A refrigerating and air-conditioning apparatus comprising:
an outdoor unit including a first blower, a condenser, a throttle device, and a compressor;

an indoor unit including a second blower and an evaporator; and
a refrigerant pipe connecting the outdoor unit and the indoor unit,
the compressor including:
a motor,
a compression mechanism driven by the motor, and
a sealed container containing the motor and the compression mechanism,
the motor including:
a stator including a plurality of split core parts arranged annularly in a circumferential direction around an axis line, and a winding, and
a rotor supported rotatably inside the stator,
each of the plurality of split core parts including:
a yoke part,
a tooth part extending in a radial direction toward the axis line from the yoke part,
a connection part including a curved surface connecting the yoke part and the tooth part,
an first insulator having an outer edge and provided on an end part of the tooth part in an axis line direction parallel to the axis line, and
a second insulator covering a side surface of the tooth part facing in the circumferential direction, wherein
the winding is wound around the connection part and the tooth part with the first insulator and the second insulator in between,
the first insulator includes a protruding part protruding beyond the curved surface, and
a length from a position farthest from the curved surface, of the outer edge of the protruding part to the curved surface is larger than five times a thickness of the second insulator.

14. The stator according to claim 1, wherein the second insulator is a film.

* * * * *